United States Patent [19]

Griswold

[11] Patent Number: 4,537,912

[45] Date of Patent: Aug. 27, 1985

[54] PROCESS FOR RAPID CURING OF POLYETHER POLYURETHANE FOAM

[75] Inventor: Azel A. Griswold, Charlotte, N.C.

[73] Assignee: Reeves Brothers, Inc., Spartanburg, S.C.

[21] Appl. No.: 647,583

[22] Filed: Sep. 5, 1984

[51] Int. Cl.³ ............................................. C08G 18/14
[52] U.S. Cl. ...................................... 521/53; 521/918
[58] Field of Search .................................. 521/53, 918

[56] References Cited

U.S. PATENT DOCUMENTS

| | | | |
|---|---|---|---|
| 3,061,885 | 11/1962 | Rogers et al. | 521/53 |
| 3,475,525 | 10/1960 | Plteris | 521/53 |
| 3,723,393 | 3/1973 | Kistner | 521/53 |
| 3,890,414 | 6/1975 | Ricciandi et al. | 521/53 |
| 4,069,286 | 1/1978 | Greinhalgh | 521/53 |
| 4,088,724 | 5/1978 | Kulment | 264/85 |

OTHER PUBLICATIONS

Plastic Foams–Frisch and Saunders (McDekker Inc., New York 1973) pp. 232–235.

Primary Examiner—Maurice J. Welsh
Attorney, Agent, or Firm—Pennie & Edmonds

[57] ABSTRACT

A process for the rapid post curing of polyether polyurethane foam in the form of porous blocks in which the foam is subjected to a mixture of water vapor and gaseous ammonia, primary or secondary amines at a temperature of about 50° to 150° F. for a period of 1 or more minutes. The cured foam recovers its original dimensions when distorted or compressed after the distortion or compression force is released.

10 Claims, 1 Drawing Figure

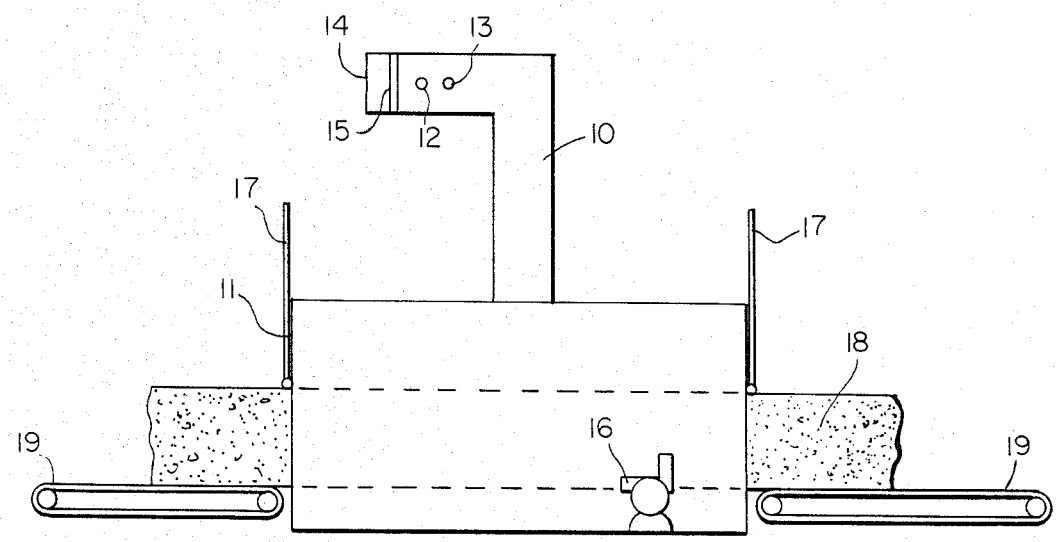

PROCESS FOR RAPID CURING OF POLYETHER POLYURETHANE FOAM

BACKGROUND OF THE INVENTION

Polyurethane foam is prepared commercially in the form of large blocks that are subsequently cut into the desired shape for use in the manufacture of various articles that require a foam padding. It is well known that polyurethane foam requires time to develop its full physical properties. In typical polyurethane foam formulations, a polyol, water and diisocyanate are reacted in the presence of catalysts or other additives. Much of the time a small percentage of terminal isocyanate groups are left unreacted in the foam structure. If the foam is distorted or compressed in this condition, it fails to recover its original dimensions when it is distorted or compressive force is released. Normally, the terminal isocyanate groups that are left unreacted in the foam structure will react with the residual water in the foam structure or with the water vapor in the atmosphere over a period of several hours or days, and the foam will achieve its full physical properties.

As pointed out in the Encyclopedia of Polymer Science and Technology (John Wiley and Sons, New York 1969) in the section on polyurethanes, polyethers are commercially the most important of the polyhydroxy compounds ("polyols") used to prepare polyurethanes. At the present time most of the polyethers used in the production of flexible polyurethane foams are derived from propylene oxide and ethylene oxide. In this preparation propylene oxide is reacted with glycerol in the presence of a basic catalyst to form a poly(oxypropylene) homopolymer which is further reacted with ethylene oxide to form the block copolymer.

Poly(oxytetramethylene) glycols are prepared by the polymerization of tetrahydrofuran. Poly(oxypropylene) triols are at present the most important class of polyethers used in the manufacture of polyurethanes. These triols are prepared by the same general reactions as poly(oxypropylene) glycols.

The most important common monomers used in polyesters for the preparation of urethane polymers are adipic acid, phthalic anhydride, ethylene glycol, propylene glycol, 1, 3-butylene glycol, 1, 3-butylene glycol and diethylene glycol. The polyurethanes derived from polyesters do not normally present post-curing problems. The term "polyether polyurethane" as used throughout this application refers to polyurethanes derived from polyether polyols.

The process of the instant invention provides a rapid method to achieve rapid and full post cure of polyether polyurethanefoam so that the foam will achieve low compressive set values as measured by the standard compression set test (Constant Deflection Compression Set Test, ASTM D-3574). The process reduces the total post curing time from a matter of many hours to less than 5 minutes. Using this process, most types of polyether polyurethane foam can be cured, fabricated and shipped in less than 24 hours.

U.S. Pat. No. 3,061,885 to Rogers and Peabody discloses a process in which pressurized air in blasts is applied to penetrate the foam block. The process covered in this patent opens up the cell structure of the foam and makes it more porous.

U.S. Pat. No. 3,890,414 to Ricciardi et al treats a freshly prepared foam, i.e. 15 to 240 minutes after it leaves the foam-forming area with air or other non-reacting gas. The inventors state by cooling the foam the physical properties are made more uniform in a shorter period of time than is required to normally develop these properties.

U.S. Pat. No. 3,723,393 to Kistner discloses a process in which isocyanate or haloformyl terminated hydrophylic polyoxyalkylene prepolymers are reacted with certain compounds containing releasable hydrogen atoms such as hydroxy, thiol, amino, amide, ammonia, or primary amines, to form a hydrophilic amide-endcapped prepolymer. The prepolymer is cross-linked with a cross-linking agent under acidic conditions to provide a cured hydrophilic material.

The post curing of polyurethane foams is dicussed in "Plastic Foams", Part I, by Frisch and Saunders (M. Dekker Inc., New York 1973) at pages 232 to 235.

BRIEF DESCRIPTION OF THE INVENTION

The process of this invention provides a method for rapidly post curing polyether polyurethane foam by subjecting blocks of the foam with a porosity of greater than about 3, preferably about 3 to 6 cubic feet per minute, as measured by the standard porosity test, at a temperature of 50° to 150° F., to an atmosphere of gaseous ammonia, primary or secondary amines in the presence of water vapor. The ammonia is present in a concentration of at least about 0.5, preferably about 0.5 to 15% by volume and the humidity is maintained at above about 50%, preferably 50 to 100% for a period of at least 1 minute, preferably 2 to 5 minutes. At the end of this time the polyether polyurethane foam is cured and will recover its original dimensions when distorted or compressive forces are applied and released.

This process provides a rapid method to achieve full post cure of polyether polyurethane foam having low compressive set values. Using this process, most types of polyether polyurethane foam can be poured, cured, fabricated and shipped in less than 24 hours.

DESCRIPTION OF THE DRAWING

The drawing is a representation of the preferred equipment for carrying out the invention.

DETAILED DESCRIPTION OF THE DRAWING

The essence of this invention resides in the discovery that the reaction of the residual isocyanate groups in foam with ammonia, primary or secondary amines in the presence of moisture is virtually instantaneous and, thus, is much faster than the reaction of residual isocyanate groups with water alone or with ammonia alone. The reaction of ammonia, amines, hydroxyl groups and water with isocyanate groups are well known in the art. The latter three reactions are involved in the chemistry of polyurethane foam formation.

However, the chemistry involved in this invention centers around the reaction of moist ammonia with the isocyanate groups left over from the foam-forming process.

These residual isocyanate groups are locked in the solid urethane structure of the foam. They are separated or isolated from any reactive hydroxyl and amino groups. Ammonia reacts with the terminal isocyanate groups according to the following equation:

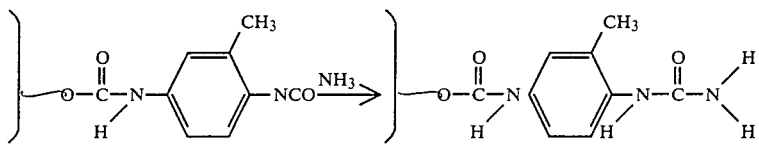

The terminal isocyanate group is converted to the monosubstituted urea groups. It is important to note that the normal urea group in polyurethane foam is a disubstituted group.

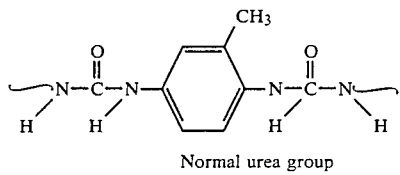
Normal urea group

It is apparent that water does not enter into the above reaction. Polyurethane foam normally contains uncombined moisture in its structure. This is normally measured in terms of moisture regain. Freshly formed foam is inherently anhydrous since water is consumed in the foaming reaction. The moisture with the ammonia simply satisfies the moisture regain capacity of the foam and in turn provides a pathway by which the ammonia can enter the solid urethane structure.

In the first step of the process of the instant application, the freshly prepared foam is allowed to age and cool for at least 4 hours. The foam must have a porosity of above about 2.0, preferably 2.0 to 6.0 cubic feet per minute as measured by the standard porosity test (Test G ASTM D-3574) in order to be readily curable.

The block is prepared for the next step of the process by covering the ends of the block and opening of the skin on the top and bottom portion of the block for gas flow. Ideally the top and bottom skins are removed by a horizontal saw mounted over the conveyor used to handle the block.

Although removal of the skin is preferred, any mechanical procedure such as routing, puncturing, pricking, or sanding may be used.

The other steps of the process are best described with reference to the Figure. The Figure shows a feed duct 10 mounted on the top of a reactor 11. The feed duct 10 includes a humidifier 12 and ammonia inlet line 13 and air intake 14 and air heater 15. A blower 16 is mounted above the conveyor 19 used to move the block of foam 18 into the reaction unit 11. Doors 17 are positioned on either end of the reaction unit. The drawing is a rough depiction of the equipment to demonstrate the process. Suitable instruments are mounted on the equipment to monitor the air flows and the pressure differential across the foam surface. The length of the reactor area is not critical but is determined by the rate at which it is desired to cure the block.

Movable side panels (not shown) are mounted on the inside of the reactor unit. These side panels effectively prevent air from being brought around the block to the sides once the foam is properly positioned in the unit with the side panels firmly against the sides of the block. At this time the space below the block is effectively isolated from the space directly above the block.

In the next step of the process, the cure is carried out by passing the humidified ammonia gas through the feed duct and into the reactor unit. The mixture of water vapor and ammonia is fed to the unit. The space below the block is connected to blowers that generate a vacuum of about 2 to 15 inches of water. Generation of vacuum on the bottom of the block causes the air to pass through the block and the space above the block. Heaters 15 are positioned in the feed duct 10 to increase the temperature to about 50° to 150° F. The humidity is controlled by feeding steam through the humidifier orifice 12. The humidity is controlled at above about 50%, preferably between 50 and 100% relative humidity at the above temperatures. A flow meter is used to regulate the amount of ammonia being fed. The ammonia concentration is maintained at about above 0.5%, preferably about 0.5 to 15% by volume.

In an especially preferred mode, of operation, the relative humidity is controlled at about 70% relative humidity, the temperature is controlled to about 115° F., and the ammonia concentration is 0.5 to 1% by volume.

The process has been described using ammonia as the gas. However, primary and secondary amines such as methylamine, dimethylamine, ethylamine and diethylamine may be substituted for the ammonia.

As pointed out above, the block of polyether polyurethane should be pretreated preferably by removing the top and bottom skins of the block. This affords rapid access of the ammonia and water vapor to the inner pores of the foam. The preferred method is to remove the skins with a saw. In the process, the side skins are left intact and the ends of the block are covered to prevent air from entering through the ends.

Although top to bottom post curing is preferred, satisfactory results are obtained when the post curing is carried out as a side to side process by removing or otherwise opening the side skins to gas flow.

The top to bottom post cure process is preferred since it is easier to control the height of the block than the width thereof.

EXAMPLE I

A continuous slab of polyether polyurethane foam was prepared using commercial foam production equipment from a formulation having the following composition:

| COMPOSITION (in parts/wt) | |
| --- | --- |
| Polyether polyol (3000 mw) | 100 |
| Toluene diisocyanate (80/20) | 49.57 |
| Stannous octoate catalyst | 0.61 |
| Silicone surfactant | 1.00 |
| Amine catalyst | .98 |
| Water | 3.55 |
| Methylene chloride | 1.50 |
| Fire retardant | 8.00 |
| Cream time in seconds | 5.00 |
| Rise time in seconds | 90 |

This formulation was used to produce the foam in examples II through VII.

EXAMPLE II

This example illustrates advantages achieved by the process of the instant application. A large autoclave was fitted with a vacuum pump, and an anhydrous ammonia feed system, and a means of purging the autoclave with compressed air in order to remove unused ammonia. The autoclave was large enough to accomodate a block of polyurethane foam 20×20×40 inches. Large blocks of flexible polyurethane foam were taken from the production line and cut to a size of 20×20×40 inches. The cut blocks were wrapped securely in polyethylene to protect them from atmospheric moisture prior to their treatment in the autoclave. These blocks will be referred to as small blocks.

A protected untreated small block was sampled after it aged for 2, 8, 14 and 24 hours from the time of production. The curing of the block was monitored using the ASTM Test D-3574 referred to above. This test is described in detail in Publication ASTM American National Standard ANSI/ASTM B-3574-77. This publication is incorporated herein by reference. Very briefly, the method consists of deflecting the foam specimen under specific conditions of time and temperature and noting the effect on the thickness of the specimen. The compression device consists of two or more flat plates arranged so that the plates are held parallel to each other and the space between the plates is adjustable to the required deflection thickness by means of spacers. The test specimens have parallel top and bottom surfaces and perpendicular sides with a dimension of 50×50×25 mm. The length in which the specimen is measured and the thickness is measured using a dial type gauge with a minimum foot area of 650 square mm.

All measurements are conducted on specimens at a temperature of 23°±2° C. at an atmosphere of 50±2% relative humidity. The oven conditions are 70°±2° C. and 5±1% relative humidity. The test specimens are measured in the manner described above and the test specimens are placed in the apparatus and deflected to either 50±1.75±1 or 90±1% of their thickness. The deflected specimen in the apparatus is placed in a mechanical convected oven for 22 hours. The specimen is removed from the apparatus and measured after 30 to 40 minutes recovery. The constant deflection compression set is calculated and expressed either as a percentage of the thickness or as a percentage of the original deflection, depending upon which of the formulae is used to make the calculation. Three runs were completed using the following technique.

1. A small block was unwrapped and placed in the autoclave. The door was closed and sealed. 2. A vacuum pump was started and vacuum of 25 to 27 inches of mercury was measured in the autoclave. This required 25 to 30 minutes. 3. The vacuum was turned off and an ammonia injection in the autoclave was immediately initiated. The pressure on the autoclave was increased from 30 to 25 inches of mercury. When the pressure reached 23 inches of mercury, the ammonia was turned off. This required about 1 minute. 4. Live steam was injected into the autoclave until the pressure in the autoclave was 21 inches of mercury. This step required 7 to 10 minutes. 5. Air was immediately injected into the autoclave until the gauge read 0 inches of mercury indicating that the autoclave was at atmospheric pressure. This required 2 minutes. 6. The autoclave vent was opened and air was injected through the system to remove excess ammonia from the autoclave. This purging step required less than 15 minutes.

In run No. 1, a small block was treated according to the above procedure except that step 3 was omitted and the block was treated only with steam. Compression set samples were cut from the block immediately and after 6, 12 and 24 hours. The sample removed immediately and the samples removed after 6 and 12 hours showed compression set loss greater than 80%, indicating that the foam was not cured. The 24 hour sample showed a compression set loss of 10%. It is obvious from this data that using steam alone, a period of about 24 hours is required to achieve cure of the polyurethane foam.

Run 2. In this run a small block was treated according to the above procedure except that step 4 was omitted. Thus the block was treated only with ammonia. Compression set samples were cut from the block as in run 1 above. The immediate and six hour samples show only partial recovery with most of the sample area at greater than 80%. The 12 and 24 hour samples showed compression set losses of less than 10%. It is obvious from this data that the post cure can be achieved in approximately 12 hours using ammonia alone.

Run 3. In this run a small block was treated according to the above procedure, all six steps being included. The immediate sample showed complete recovery (less than 10%). The 6, 12 and 24 hour samples showed losses of less than 10% and were theretofore completely recovered. It is obvious from this data that the polyether polyurethane foam cures immediately when treated with a mixture of steam and ammonia.

Examples II and IV are described with reference to the drawing. There are two techniques that can be used to post cure a properly prepared block. These two techniques are discussed in the following examples.

EXAMPLE III

This example illustrates the "staging" technique. In this technique, the ends of the block 18 to be treated are covered and the block is run into the treatment zone 11 by means of conveyor 19 until only two or three inches protrude from the opposite ends of the treating zone 11. The vertical end doors 17 are dropped down until the sealed rollers on the bottom of the doors press into the foam 18, 0.5 to 1 inch. The blower 16 on the bottom plenum is started automatically and automatically starts the heater 15 and the humidifer 12 so that humidified air passes through the heat duct 10 and is moved through the foam block 18. Ammonia then moves through the orifice 13 into the feed duct 10 to start the cure. The time at which the ammonia feed was started is noted and the gaseous mixture is allowed to pass through the block for the desired period of time, preferably 2 to 5 minutes. At the end of the desired cure time, the conveyor 19 is started and a fresh, untreated portion of the block is run into the treating area 11. As soon as the conveyor stops, the time is again noted and a new section is treated as before. This stepwise procedure is repeated until the entire length of the block has been treated. Using this method with a staging length of 14 feet and a cure time of 2 minutes, a block 100 feet long can be cured in about 18 minutes.

EXAMPLE IV

The following example illustrates the second technique the "continuous" technique. In this technique the treatement of the first section of the block is identical with the staging procedure. After the initial section is treated, the conveyor 19 is started and the block is moved at a constant speed through the treating zone without stopping. The speed through the treating zone is limited by the length of the block and the foam porosity. Ideally the conveyor 19 will move at a speed of 2 to 30 feet per minute with 10 to 25 feet per minute being preferred. Using this method a block 100 feet long can be cured about 11 minutes.

EXAMPLE V

In this example, the reaction times were 1 and 2 minutes. The ammonia flow was kept constant and the air flow (about 70% relative humidity) was kept constant. The data collected in these two runs is set out in Table 1 below.

TABLE 1

|  | B | C |
|---|---|---|
| AMMONIA CURE - BLOCK FOAM SPECIFICATIONS |  |  |
| Cut Sample Height (inches) | 36 | 36 |
| Sample Volume (cu. ft.) | 6.75 | 6.75 |
| REACTION TIME (minutes) | 1 | 2 |
| AIR DATA |  |  |
| Pressure Drop (inches of water) | 4 | 4 |
| AMMONIA DATA |  |  |
| Ammonia Flow-Flowmeter (cfm) | 1.4 | 1.4 |
| REACTION INFO |  |  |
| Index (Ratio of NC0 to hydroxy in polyol) | 106 | 106 |
| Formulation wgt. of TDI (lbs) | 51.97 | 51.97 |
| CURE DATA |  |  |
| Foam Age (minutes) | 210 | 251 |
| Temp. Reached at Bottom (°F.) | 196 | 202 |
| Temperature Change (°F.) | 45 | 40 |
| CONTROL - 90% Compr. Sets |  |  |
| TOP | 86.2 | 86.2 |
| BOTTOM | 86.8 | 86.8 |
| AFTER CURE - 90% Compr. Sets |  |  |
| TOP | 11.5 | 12.4 |
| BOTTOM | 11.5 | 9.9 |

It is obvious from this data that a satisfactory cure of the polyurethane is obtained with a reaction time as low as 1 minute. There is a slight improvement with a reaction time of 2 minutes.

EXAMPLE VI

In this example, the reaction was carried out for a period of 4 minutes. The humidified air flow was varied from 2 to 5 inches of water. The ammonia flow was kept constant. The data collected in this series of runs is set out in the Table below:

TABLE 2

|  | B | C | D | E |
|---|---|---|---|---|
| AMMONIA CURE - BLOCK FOAM SPECIFICATIONS |  |  |  |  |
| Cut Sample Height (Inches) | 36 | 36 | 36 | 36 |
| Sample Volume (cu. ft.) | 6.75 | 6.75 | 6.75 | 6.75 |
| REACTION TIME (minutes) | 4 | 4 | 4 | 4 |
| AIR DATA |  |  |  |  |
| Pressure Drop (inches of water) | 2 | 3 | 4 | 5 |
| Balanced Air Flow (cu. ft. min.) | 26 | 42 | 49 | 56 |
| AMMONIA DATA |  |  |  |  |
| Ammonia Flow-Flowmeter (cfm) | 1.4 | 1.4 | 1.4 | 1.4 |
| Conc. of Ammonia in Air (Vol. %) | 8.38 | 5.36 | 4.63 | 4.07 |
| REACTION INFO |  |  |  |  |
| Index (Ratio of NC0 to hydroxy in polyol) | 106 | 106 | 106 | 106 |

TABLE 2-continued

|  | B | C | D | E |
|---|---|---|---|---|
| Formulation wgt. of TDI (lbs) | 51.97 | 51.97 | 51.97 | 51.97 |
| Excess Isocyanate (%) | 6 | 6 | 6 | 6 |
| CURE DATA |  |  |  |  |
| Foam Age (minutes) | 109 | 134 | 234 | 286 |
| Temp. Reached at Bottom (F.) | 288 | 256 | 147 | 151 |
| Temperature Change (°F.) | 109 | 134 | 61 | 41 |
| CONTROL - 90% Compr. Sets |  |  |  |  |
| TOP | 86.5 | 86.5 | 86.5 | 86.5 |
| BOTTOM | 85.3 | 85.3 | 85.3 | 85.3 |
| AFTER CURE - 90% Compr. Sets |  |  |  |  |
| TOP | 13.2 | 14.9 | 12.4 | 12.2 |
| BOTTOM | 72.5 | 12.8 | 10.2 | 10.7 |

It is apparent from this data that satisfactory results are obtained when air humidified to 70% relative humidity is used at a pressure of 3 to 5 inches of water. The data from run B indicates that an air pressure of 2 inches of water is not sufficient to completely cure the bottom of the block when a reaction time of 4 minutes is used.

EXAMPLE VII

This example illustrates the importance of allowing the foam to stand for at least 2 hours prior to curing. In this series of runs, the humidified air flow and ammonia flow were kept constant and the foam used was removed from the system and treated after 32, 51 and 69 minutes. The data collected in this series of runs is set out in the table below.

TABLE 3

|  | B | C | D |
|---|---|---|---|
| AMMONIA CURE - BLOCK FOAM SPECIFICATIONS |  |  |  |
| Cut Sample Height (inches) | 32 | 32 | 32 |
| Sample Volume (cu. ft.) | 6.0 | 6.0 | 6.0 |
| REACTION TIME (minutes) | 1 | 2 | 3 |
| AIR DATA |  |  |  |
| Pressure Drop (inches of water) | 3 | 3 | 3 |
| AMMONIA DATA |  |  |  |
| Ammonia Flow-Flowmeter (cfm) | 1.4 | 1.4 | 1.4 |
| REACTION INFO |  |  |  |
| Index (Ratio of NC0 to hydroxy in polyol) | 106 | 106 | 106 |
| Formulation wgt. of TDI (lbs) | 51.97 | 51.97 | 51.97 |
| Excess Isocyanate (%) | 6 | 6 | 6 |
| CURE DATA |  |  |  |
| Foam Age (minutes) | 69 | 51 | 32 |
| Temp. Reached at Bottom (°F.) | 295 | 286 | 300 |
| Temperature Change (°F.) | 49 | 38 | 32 |
| CONTROL - 90% Compr. Sets |  |  |  |
| TOP | 86.2 | 86.2 | 86.2 |
| BOTTOM | 86.8 | 86.8 | 86.8 |
| AFTER CURE |  |  |  |
| TOP | 14.8 | 15.3 | 74.3 |
| BOTTOM | 85.8 | 82.9 | 84.7 |

It is apparent from these data that completely satisfactory results are not obtained when the foam is allowed to stand for 32, 51 and 69 minutes prior to treatment with air having a humidity and gaseous ammonia. Increasing the reaction time to 3 minutes did not improve the results. The 90% compression set value for the bottom of each of these samples is above 82, indicating that the polyurethane foam had not been thoroughly cured.

EXAMPLE VIII

In this example foams were prepared from the following formulations.

| COMPOSITION (in parts/wt) | | | |
| --- | --- | --- | --- |
|  | B | C | D |
| Polyether polyol (3000 mw) | 100 | 100 | 100 |
| Toluene diisocyanate (80/20) | 57.40 | 57.40 | 57.40 |
| Stannous octoate catalyst | 0.90 | 0.90 | 0.45 |
| Silicone surfactant | 1.05 | 1.05 | 0.90 |
| Amine catalyst | 0.46 | 0.46 | 0.77 |
| Water | 4.45 | 4.45 | 2.6 |
| Methylene chloride |  |  | 6.0 |
| Fire retardant | 12 |  | 12 |

The reaction time was varied from 2 to 4 minutes and the humidified air pressure was maintained at 2 and 3 inches of water.

TABLE 4

|  | B | C | D |
| --- | --- | --- | --- |
| AMMONIA CURE - BLOCK FOAM SPECIFICATIONS | | | |
| Foam Type | CS1535 | A4140 | A1130 |
| Cut Sample Height (inches) | 32 | 28 | 32 |
| REACTION TIME (minutes) | 4 | 2 | 2 |
| AIR DATA | | | |
| Pressure Drop (inches of water) | 2 | 3 | 2 |
| AMMONIA DATA | | | |
| Ammonia Flow-Flowmeter (cfm) | 1.4 | 1.4 | 1.4 |
| Conc. of Ammonia in Air (Vol. %) | 5.48 | 4.4 | 4.52 |
| REACTION INFO | | | |
| Index (Ratio of NC0 to Hydroxy in polyol) | 110 |  | 108 |
| Excess Isocyanate | 10 |  | 8 |
| CURE DATA | | | |
| Foam Age (minutes) | 237 | 286 | 354 |
| Temp. Reached at Bottom (°F.) | 156 | 187 | 111 |
| Temperature Change (°F.) | 38 | 56 | 19 |
| CONTROL - 90% Compr. Sets | | | |
| TOP | 87.7 | 5.6 | 24 |
| BOTTOM | 88.3 | 4.5 | 72.1 |
| AFTER CURE - 90% Compr. Sets | | | |
| TOP | 13.9 | 6.4 | 17.3 |
| BOTTOM | 9.9 | 3.8 | 15.6 |

It is apparent from the data that the process of the instant application gives satisfactory results when different polyether polyurethane foams are used. The samples which were made from B and C had a somewhat better and more complete cure than sample D. However, the results indicated the sample designated D had in fact been satisfactorily cured.

I claim:

1. A process for the rapid post curing of polyether polyurethane foam blocks without adversely affecting the compression set of said foam which process comprises subjecting said polyether polyurethane foam having a porosity of greater than about 3 cubic feet per minute to a mixture of air and gaseous ammonia, primary or secondary amine at a temperature of above about 50° F., wherein the amount of ammonia, primary or secondary amine is present at a concentration of at least 0.5% by volume of the air, the air has a relative humidity above about 50% and the air/ammonia or primary amine mixture reacts with the foam for a period of at least one minute.

2. The process according to claim 1 wherein the temperature is maintained at about 110° to 120° F., the relative humidity at about 65 to 70% relative humidity, the ammonia or primary amine concentration is maintained at about 0.5 to 15% of the air/ammonia or primary amine mixture and the reaction is carried on for about 1 to 5 minutes.

3. The process according to claim 1 wherein the primary amine is selected from the group comprising methyl amine and ethyl amine.

4. The process according to claim 1 wherein the skin of said block is opened to gas flow.

5. The process according to claim 1 wherein the skin of said block is removed from the top and bottom of the block and the ends of the block are covered to prevent escape of air therefrom.

6. A process for the rapid post curing of polyether polyurethane foam blocks having a porosity greater than about 3 cubic feet per minute without adversely affecting the compression set of said foam which comprises
 (a) positioning said block in a confined space,
 (b) opening the skin on the top and bottom of said block to gas flow,
 (c) passing a mixture of gaseous ammonia or primary amine and air wherein ammonia, primary or secondary amine is present in a concentration of about 0.5% by volume, said air having a humidity at least above about 50% into one side of said block,
 (d) maintaining a vacuum on the opposite side of said block,
 (e) continuing to pass the air/ammonia or primary amine mixture through said block for at least one minute, while maintaining the temperature at about 50° F.

7. The process according to claim 5 wherein the ends of the block are covered to prevent escape of air therefrom.

8. The process according to claim 5 wherein the temperature is maintained at about 110° to 120° F., the relative humidity of the air at about 50 to 100% relative humidity and the gaseous ammonia or primary amine is maintained at a concentration of 0.5 to 15% of the air.

9. The process according to claim 5 wherein the primary amine is selected from the group comprising methyl amine and ethyl amine.

10. The process according to claim 5 wherein the skin is removed from the top and bottom of the block.

* * * * *

REEXAMINATION CERTIFICATE (983rd)
United States Patent [19]

Griswold

[11] B1 4,537,912

[45] Certificate Issued  Jan. 3, 1989

[54] PROCESS FOR RAPID CURING OF POLYETHER POLYURETHANE FOAM

[75] Inventor: Azel A. Griswold, Charlotte, N.C.

[73] Assignee: Reeves Brothers, Inc., Spartanburg, S.C.

Reexamination Request:
No. 90/001,522, Jun. 13, 1988

Reexamination Certificate for:
Patent No.: 4,537,912
Issued: Aug. 27, 1985
Appl. No.: 647,583
Filed: Sep. 5, 1984

[51] Int. Cl.$^4$ .................................................. C08G 18/14
[52] U.S. Cl. ........................................ 521/53; 521/918
[58] Field of Search ................................. 521/53, 918

[56] References Cited

U.S. PATENT DOCUMENTS 2,888,408  5/1959  Rogers, Jr. et al. ............... 260/2.5
3,061,885  11/1962  Rogers et al. .......................... 521/53

Primary Examiner—Maurice J. Welsh
Attorney, Agent, or Firm—Pennie & Edmonds

[57] ABSTRACT

A process for the rapid post curing of polyether polyurethane foam in the form of porous blocks in which the foam is subjected to a mixture of water vapor and gaseous ammonia, primary or secondary amines at a temperature of about 50° to 150° F. for a period of 1 or more minutes. The cured foam recovers its original dimensions when distorted or compressed after the distortion or compression force is released.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-10 is confirmed.

* * * * *